United States Patent
Naserian et al.

(10) Patent No.: US 10,549,762 B2
(45) Date of Patent: Feb. 4, 2020

(54) DISTINGUISH BETWEEN VEHICLE TURN AND LANE CHANGE

(71) Applicant: GM Global Technology Operations LLC, Detroit, MI (US)

(72) Inventors: Mohammad Naserian, Windsor (CA); Allan K. Lewis, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 15/664,349

(22) Filed: Jul. 31, 2017

(65) Prior Publication Data

US 2019/0031205 A1    Jan. 31, 2019

(51) Int. Cl.
| | |
|---|---|
| *B60W 50/10* | (2012.01) |
| *B60W 10/18* | (2012.01) |
| *B60W 10/20* | (2006.01) |
| *B60W 50/14* | (2012.01) |
| *G08G 1/01* | (2006.01) |
| *G08G 1/04* | (2006.01) |
| *B60W 50/00* | (2006.01) |

(52) U.S. Cl.
CPC ............ *B60W 50/10* (2013.01); *B60W 10/18* (2013.01); *B60W 10/20* (2013.01); *B60W 50/14* (2013.01); *G08G 1/012* (2013.01); *G08G 1/0116* (2013.01); *G08G 1/0133* (2013.01); *G08G 1/04* (2013.01); *B60W 2050/0062* (2013.01); *B60W 2420/42* (2013.01); *B60W 2420/52* (2013.01); *B60W 2550/10* (2013.01); *B60W 2550/22* (2013.01); *B60W 2550/402* (2013.01); *B60W 2550/408* (2013.01); *B60W 2710/18* (2013.01); *B60W 2710/20* (2013.01)

(58) Field of Classification Search
CPC ................. B60W 10/18; B60W 10/20; B60W 2050/0062; B60W 50/10; B60W 50/14; G08G 1/167; G08G 1/162; G08G 1/0133; G08G 1/0116; G08G 1/012; G08G 1/04
See application file for complete search history.

(56) References Cited

U.S. PATENT DOCUMENTS

| | | | | |
|---|---|---|---|---|
| 9,475,491 | B1 * | 10/2016 | Nagasaka | B60W 30/16 |
| 10,134,280 | B1 * | 11/2018 | You | B60Q 1/34 |
| 2010/0253542 | A1 * | 10/2010 | Seder | G01S 7/22 |
| | | | | 340/932.2 |

(Continued)

*Primary Examiner* — Mussa A Shaawat
(74) *Attorney, Agent, or Firm* — Cantor Colburn LLP (57) ABSTRACT

A system and method to distinguish between a lane change and a turn of a vehicle as an intended movement of the vehicle based on a driver-initiated motion toward an adjacent lane that is adjacent to a lane occupied by the vehicle include obtaining input from one or more sources. The one or more sources include a sensor system or a communication system. The method also includes processing the input from the one or more sources to obtain indirect information that indicates a direction of travel in the lane adjacent or to obtain direct information specific to a location of the vehicle, determining whether the lane change or the turn is more likely to be the intended movement based on the indirect information or the direct information, and modifying an action of a vehicle system based on the determining whether the lane change or the turn is more likely.

4 Claims, 11 Drawing Sheets

(56) References Cited

U.S. PATENT DOCUMENTS

| | | | | |
|---|---|---|---|---|
| 2010/0292886 | A1* | 11/2010 | Szczerba | G01C 21/365 |
| | | | | 701/31.4 |
| 2012/0173069 | A1* | 7/2012 | Tsimhoni | G01C 21/365 |
| | | | | 701/25 |
| 2012/0271500 | A1* | 10/2012 | Tsimhoni | B62D 1/28 |
| | | | | 701/23 |
| 2015/0321699 | A1* | 11/2015 | Rebhan | B60Q 9/00 |
| | | | | 701/23 |
| 2015/0375703 | A1* | 12/2015 | Modi | B60R 21/017 |
| | | | | 307/10.1 |
| 2017/0113665 | A1* | 4/2017 | Mudalige | G08G 1/166 |
| 2017/0113683 | A1* | 4/2017 | Mudalige | B60W 30/08 |
| 2017/0131719 | A1* | 5/2017 | Micks | B60W 40/08 |
| 2017/0190334 | A1* | 7/2017 | Zelman | B60W 40/09 |
| 2017/0193384 | A1* | 7/2017 | Mudalige | B60W 50/0097 |
| 2017/0247040 | A1* | 8/2017 | Miller | B60W 10/04 |
| 2017/0248951 | A1* | 8/2017 | Perkins | G05D 1/0248 |
| 2017/0248952 | A1* | 8/2017 | Perkins | B60W 50/082 |
| 2017/0248953 | A1* | 8/2017 | Kelley | B62D 15/0265 |
| 2017/0249844 | A1* | 8/2017 | Perkins | B60W 50/0097 |
| 2018/0204463 | A1* | 7/2018 | Khalifeh | B62D 6/001 |
| 2018/0267557 | A1* | 9/2018 | Yan | B60W 40/08 |
| 2018/0281785 | A1* | 10/2018 | Berntorp | G08G 1/166 |
| 2018/0286095 | A1* | 10/2018 | Kusayanagi | B60R 1/00 |
| 2018/0292824 | A1* | 10/2018 | Kazemi | G05D 1/0088 |
| 2018/0292830 | A1* | 10/2018 | Kazemi | G01C 21/3453 |
| 2018/0293894 | A1* | 10/2018 | Zhang | G08G 1/167 |
| 2018/0326998 | A1* | 11/2018 | Aoi | B60W 50/10 |
| 2018/0341269 | A1* | 11/2018 | Lv | G01C 21/3453 |
| 2018/0342046 | A1* | 11/2018 | Tomatsu | G06T 3/60 |
| 2018/0354517 | A1* | 12/2018 | Banno | B60W 50/14 |
| 2019/0047621 | A1* | 2/2019 | Kim | B62D 15/025 |

* cited by examiner

DISTINGUISH BETWEEN VEHICLE TURN AND LANE CHANGE

INTRODUCTION

The subject disclosure relates to distinguishing between a vehicle turn and a lane change.

Sensor systems are increasingly used in vehicles (e.g., automobiles, farm equipment, construction equipment, automated factory equipment, trucks). The sensor systems facilitate warnings and automation (e.g., automatic braking, autonomous driving). In certain situations, the sensor systems and controllers that interpret the information from those systems can misinterpret a driver action. The misinterpretation may result in false warnings or incorrect automated actions that annoy the driver. An exemplary case is when a lane change is misinterpreted as a turn, resulting in warnings or actions associated with a turn. Accordingly, it is desirable to provide systems and methods to distinguish between a vehicle turn and a lane change.

SUMMARY

In one exemplary embodiment, a method of distinguishing between a lane change and a turn of a vehicle as an intended movement of the vehicle based on a driver-initiated motion toward an adjacent lane that is adjacent to a lane occupied by the vehicle includes obtaining input from one or more sources. The one or more sources include a sensor system or a communication system. The method also includes processing the input from the one or more sources to obtain indirect information that indicates a direction of travel in the lane adjacent or to obtain direct information specific to a location of the vehicle, and determining whether the lane change or the turn is more likely to be the intended movement based on the indirect information or the direct information. An action of a vehicle system is modified based on determining whether the lane change or the turn is more likely. obtaining the indirect information includes determining whether a distance between the vehicle and a double line or double-dashed line is more than a lane width such that another lane separates the vehicle from the double line or the double-dashed line.

In addition to one or more of the features described herein, obtaining the indirect information includes determining whether a distance between the vehicle and a double line or double-dashed line is more than a lane width such that another lane separates the vehicle from the double line or the double-dashed line.

In addition to one or more of the features described herein, obtaining the indirect information includes determining whether a distance between the vehicle and a median is more than a lane width such that another lane separates the vehicle from the median.

In addition to one or more of the features described herein, obtaining the indirect information includes determining a direction of travel of a vehicle in the adjacent lane.

In addition to one or more of the features described herein, obtaining the indirect information includes determining that a traffic signal indicating an intersection is within a threshold distance.

In addition to one or more of the features described herein, obtaining the direct information is based on communication from another vehicle, infrastructure, or pedestrian.

In addition to one or more of the features described herein, obtaining the direct information is based on the input from a navigation system.

In addition to one or more of the features described herein, obtaining the direct information is based on a marking on the lane occupied by the vehicle.

In addition to one or more of the features described herein, the modifying the action of the vehicle system includes modifying a warning provided through an infotainment system.

In addition to one or more of the features described herein, the modifying the action of the vehicle system includes cancelling an automatic braking or steering action.

In another exemplary embodiment, a system to distinguish between a lane change and a turn of a vehicle as an intended movement of the vehicle based on a driver-initiated motion toward an adjacent lane that is adjacent to a lane occupied by the vehicle includes one or more sources to provide input. The one or more sources include a sensor system or a communication system. The system also includes a controller to process the input from the one or more sources to obtain indirect information that indicates a direction of travel in the lane adjacent or to obtain direct information specific to a location of the vehicle and determine whether the lane change or the turn is more likely to be the intended movement based on the indirect information or the direct information. The controller modifies an action of a vehicle system based on determining whether the lane change or the turn is more likely.

In addition to one or more of the features described herein, the controller obtains the indirect information based on determining whether a distance between the vehicle and a double line or double-dashed line is more than a lane width such that another lane separates the vehicle from the double line or the double-dashed line.

In addition to one or more of the features described herein, the controller obtains the indirect information based on determining whether a distance between the vehicle and a median is more than a lane width such that another lane separates the vehicle from the median.

In addition to one or more of the features described herein, the controller obtains the indirect information based on determining a direction of travel of a vehicle in the adjacent lane.

In addition to one or more of the features described herein, the controller obtains the indirect information based on determining that a traffic signal indicating an intersection is within a threshold distance.

In addition to one or more of the features described herein, the controller obtains the direct information based on communication from another vehicle, infrastructure, or pedestrian.

In addition to one or more of the features described herein, the controller obtains the direct information based on the input from a navigation system.

In addition to one or more of the features described herein, the controller obtains the direct information based on a marking on the lane occupied by the vehicle.

In addition to one or more of the features described herein, the controller modifies the action of the vehicle system by modifying a warning provided through an infotainment system.

In addition to one or more of the features described herein, the controller modifies the action of the vehicle system by cancelling an automatic braking or steering action.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

As previously noted, when a lane change is misinterpreted as a turn, the result may be false warnings or incorrect automated actions. This is because oncoming traffic may be detected by one or more sensors systems during the lane change that is misinterpreted as a turn. Embodiments of the systems and methods detailed herein relate to distinguishing between a vehicle turn and a lane change to ensure that the appropriate warnings and actions are undertaken. Specifically, one or more sensor or other systems (e.g., camera, communication system, navigation system, radar, lidar) are used to determine the vehicle location and the corresponding likelihood of a turn or a lane change.

Figure 1:
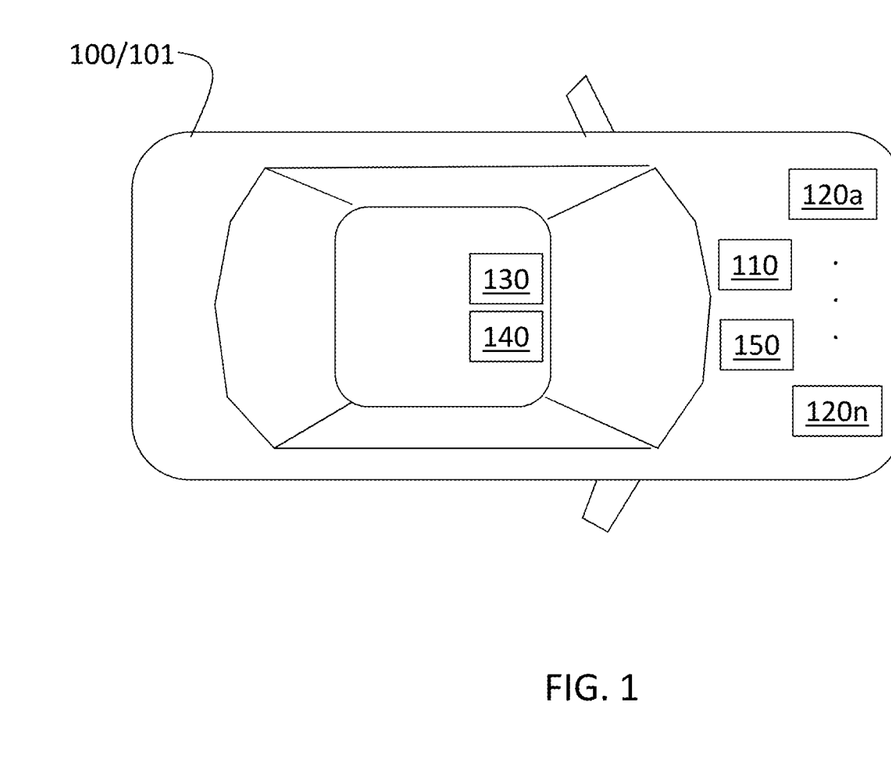
FIG. 1 is a block diagram of a system to distinguish between a turn and a lane change of a vehicle according to one or more embodiments.

In accordance with an exemplary embodiment, FIG. 1 is a block diagram of a system to distinguish between a turn and a lane change of a vehicle 100. The vehicle 100 shown in FIG. 1 is an automobile 101. The automobile 101 includes a controller 110, a number of sensor systems 120a through 120n (generally referred to as 120), one or more communication interfaces 130, one or more user interface systems 140, and one or more vehicle systems 150.

Exemplary sensor systems 120 include a radar system, a camera, a lidar system, and a navigation system including a global positioning system (GPS) receiver. The radar system may include multiple antennas located in different parts of the automobile 101. The radar system detects the range and velocity of reflective targets in the field of view of the radar system and may be used to determine if another vehicle 100 is approaching the automobile 101, for example. The radar system may provide information to one or more vehicle systems 150. Exemplary vehicle systems 150 include a collision avoidance system that implements automatic steering or braking actions to avoid a collision, and warning systems that provide an audio or visual alert to the driver regarding oncoming vehicles 100, for example. Exemplary communication interfaces 130 include multiple cellular channels (e.g., fourth generation 4G long-term evolution (LTE), fifth generation (5G)), WiFi, and Bluetooth. The user interface systems 140 include the infotainment system.

The controller 110 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. When the vehicle 100 initiates a movement that may be a lane change or a turn (e.g., turn signal turned on, steering wheel turned more than a threshold angle), the controller 110 uses information from one or more sources (e.g., a vehicle sensor 120, user interface system 140) to distinguish whether the vehicle 100 is about to make a lane change or a turn.

The determination of whether a turn or lane change has been initiated may be used to augment safety systems that monitor oncoming traffic and provide warnings or automated actions during a turn. For example, the radar system or other sensor system 120 may determine if there is oncoming traffic. During a turn, the determination that there is oncoming traffic may trigger one or more vehicle systems 150. For example, the infotainment system may display a warning to the driver. As another example, automatic braking or steering may be initiated by vehicle systems 150 like the collision avoidance system. When a lane change is distinguished from a turn, the controller 110 may modify the actions taken by these vehicle systems 150.

FIGS. 2-8 indicate exemplary scenarios in which a turn is distinguished from a lane change according to one or more embodiments. In each example, the controller 110 determines whether a lane change or a turn is more likely the intended motion initiated by the driver of the vehicle 100. The controller 110 makes the determination based on the location of the vehicle 100, the direction in which traffic in the adjacent lane is moving, road markings, or communication, for example. In several examples, indirect information is used to extract indicia of whether the lane adjacent to the lane occupied by the vehicle 100 has traffic that is oncoming (thereby indicating a turn) or traveling in the same direction as the vehicle 100 (thereby indicating a lane change). In other examples, direct information such as road markings 830 (FIG. 8), communication, or navigation information is used.

Depending on the location of the vehicle 100, a turn in one direction may be treated differently than a turn in another direction. For example, in the United States, where vehicles 100 operate on the right side of the road, a left turn may trigger vehicle systems 150 to provide warnings or take automated actions but a right turn may not cause any actions that may require modification based on a distinction between a turn and lane change. On the other hand, in the United Kingdom, where vehicles 100 operate on the left side of the road, a right turn may be treated like a left turn in the United States, and a left turn may not cause any actions that may require modification according to the embodiments herein. For explanatory purposes, the distinction between a lane change into a lane that is on the left of the vehicle 100 and a left turn that requires crossing oncoming traffic (e.g., as in the United States) is discussed. However, the discussion is not intended to limit the systems and methods of the embodiment to right-side driving situations.

Figure 2:
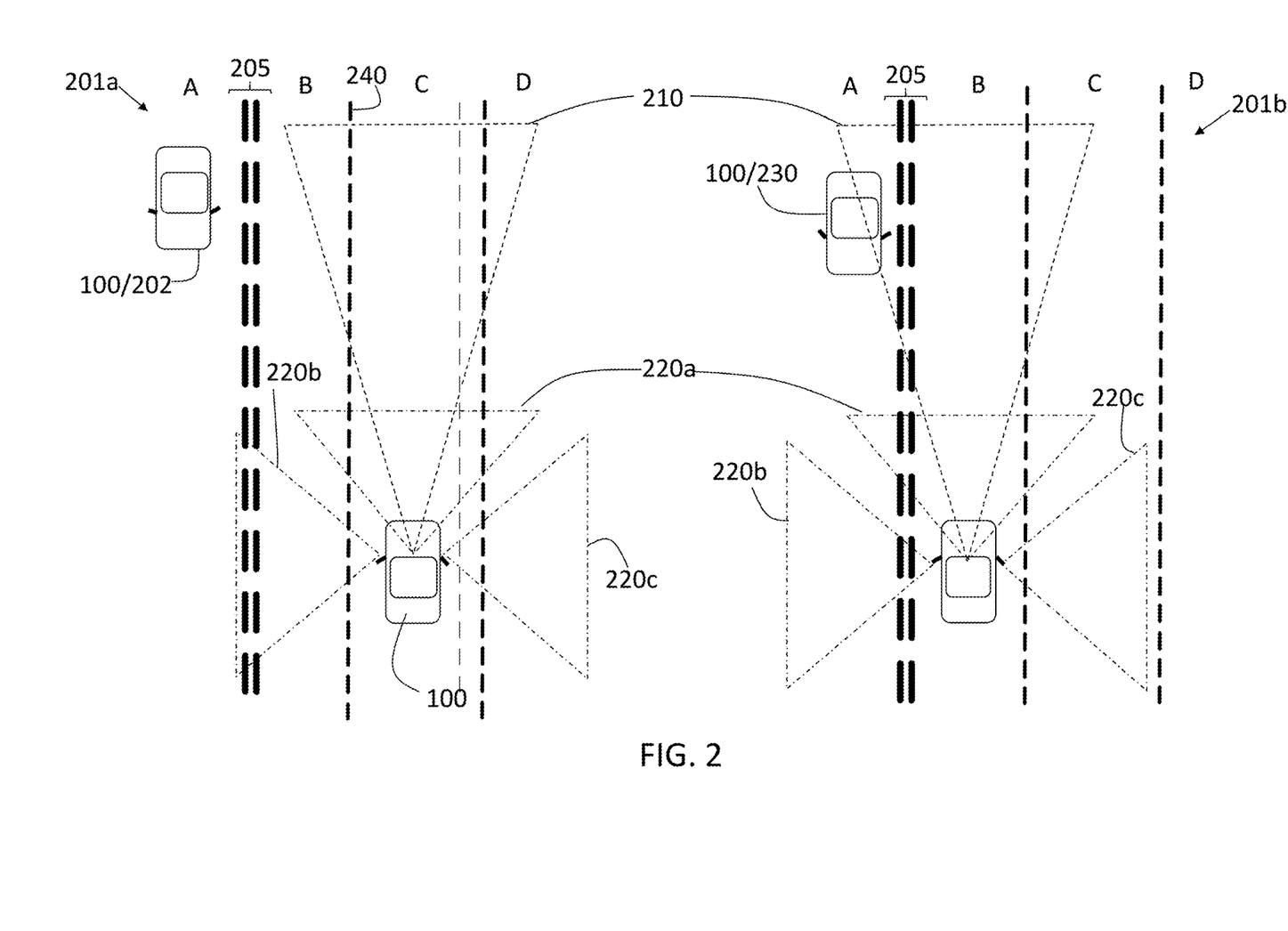
FIG. 2 shows two scenarios in which a lane change is distinguished from a turn according to one or more embodiments.

FIG. 2 shows two scenarios 201*a*, 201*b* in which a lane change is distinguished from a turn according to one or more embodiments. The two scenarios 201*a*, 201*b* shown in FIG. 2 are at the same location at which four lanes A, B, C, D are indicated. Lanes B, C, and D are on the right side of a double-broken line 205, and lane A is on the left side of the double-broken line 205. Thus, the traffic in lane A travels in the opposite direction as compared with traffic in lanes B, C, and D. A vehicle 100 travelling on the right side of double-broken line 205 has a radar system and three cameras as part of the sensor systems 120, as shown in FIG. 1. FIG. 2 indicates the field of view 210 of the radar system and the respective fields of view 220*a*, 220*b*, 220*c* of the three camera systems. An oncoming vehicle 100 in lane A is within the field of view 210 of the radar system in scenario 201*b* but not within the field of view 210 in scenario 201*a*. Thus, vehicle 100 in lane A is labeled as an undetected object 202 in scenario 201*a* and, is labeled as a potential object 230 of concern that is detected by the radar system only in scenario 201*b*. The field of view 210 may be of a lidar or other sensor system 120 in alternate embodiments.

The camera with the field of view 220*b* records the double-broken line 205 and the single broken line 240 to the left of the vehicle 100 in scenario 201*a*. The color of the double-broken line 205 may be identified as yellow by the sensor system 120. The presence of the single broken line 240 and distance to the double-broken line 205 would indicate to the controller 110 that the vehicle 100 is not in a position to make a left turn in scenario 201*a*. That is, the driver of the vehicle 100 should not initiate a left turn from a lane (lane C) that is separated from the other side of the road by another lane of traffic (lane B) that is traveling in the same direction. As a result, any motion initiated by the driver that could be interpreted as either a lane change into lane B or a left turn would be distinguished by the controller 110 as being most likely a lane change.

Scenario 201*b* differs from scenario 201*a* in that the camera with the field of view 220*b* sees the double-broken line 205 next to the vehicle 100 with no other lines separating the vehicle 100 from the double-broken line 205. This information indicates to the controller 110 that the vehicle 100 cannot properly make a lane change to a lane to the left of the vehicle 100. Such a lane change would put the vehicle 100 in the same lane as oncoming traffic. Thus, in this scenario 201*b*, based on information from the camera with field of view 220*b*, the controller 110 would determine that any motion initiated by the driver that could be interpreted as either a lane change into lane A or a left turn would most likely be a left turn. In this case, the detection of the vehicle 100 as an oncoming object 230 is relevant to any warning or action taken by vehicle systems 150.

Figure 3:
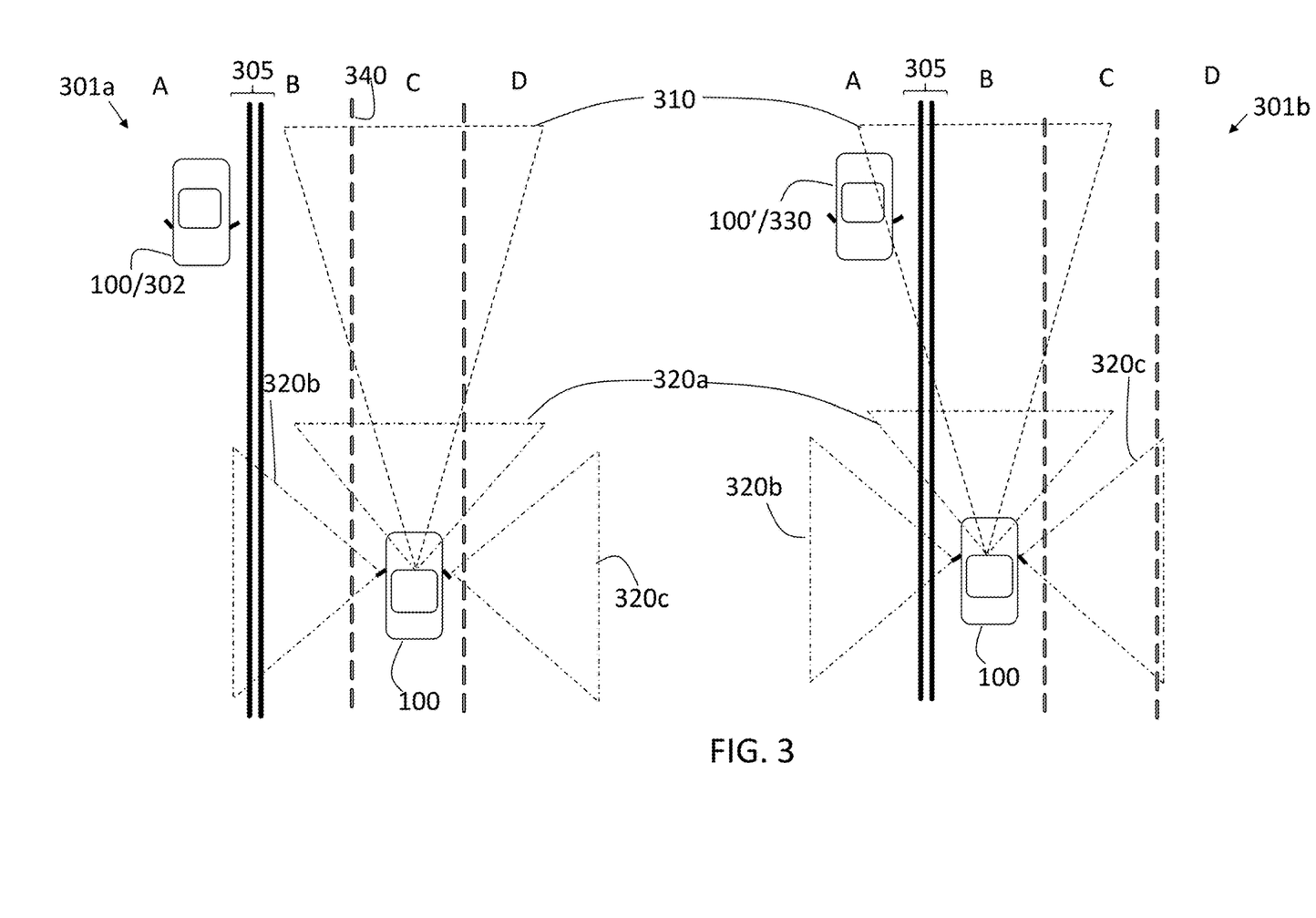
FIG. 3 illustrates two more scenarios in which a lane change is distinguished from a turn according to one or more embodiments.

FIG. 3 shows two scenarios 301*a*, 301*b* in which a lane change is distinguished from a turn according to one or more embodiments. The two scenarios 301*a*, 301*b* shown in FIG. 3 are at the same location at which four lanes A, B, C, D are indicated. Lanes B, C, and D are on the right side of a double-solid line 305, and lane A is on the left side of the double-solid line 305. Thus, the traffic in lane A travels in the opposite direction as compared with traffic in lanes B, C, and D. A vehicle 100 travelling on the right side of double-solid line 305 has a radar system and three cameras as part of the sensor systems 120, as shown in FIG. 1. Like FIG. 2, FIG. 3 indicates the field of view 310 of the radar system and the respective fields of view 320*a*, 320*b*, 320*c* of the three camera systems. An oncoming vehicle 100 in lane A is within the field of view 310 of the radar system in scenario 301*b* but not within the field of view 310 in scenario 301*a*. Thus, the vehicle 100 in lane A is labeled as an undetected object 302 in scenario 301*a* and is labeled as a potential object 330 of concern that is detected by the radar system only in scenario 301*b*. The field of view 310 may be of a lidar or other sensor system 120 in alternate embodiments.

The camera with the field of view 320*b* records the double-solid line 305 and the single broken line 340 to the left of the vehicle 100 in scenario 301*a*. The presence of the single broken line 340 and distance to the double-solid line 305 would indicate to the controller 110 that the vehicle 100 is not in a position to make a left turn in scenario 301*a*. That is, the driver of the vehicle 100 should not initiate a left turn from a lane (lane C) that is separated from the other side of the road by another lane of traffic (lane B) that is traveling in the same direction. As a result, any motion initiated by the driver that could be interpreted as either a lane change into lane B or a left turn would be distinguished by the controller 110 as being most likely a lane change.

Scenario 301*b* differs from scenario 301*a* in that the camera with the field of view 320*b* sees the double-solid line 305 next to the vehicle 100 with no other lines separating the vehicle 100 from the double-solid line 305. This information indicates to the controller 110 that the vehicle 100 cannot properly make a lane change to a lane to the left of the vehicle 100. Such a lane change would put the vehicle 100 in the same lane as oncoming traffic. Thus, in this scenario 301*b*, based on information from the camera with field of view 320*b*, the controller 110 would determine that any motion initiated by the driver that could be interpreted as either a lane change into lane A or a left turn would most likely be a left turn. In this case, the detection of the vehicle 100 as an oncoming object 330 is relevant to any warning or action taken by vehicle systems 150.

Figure 4:
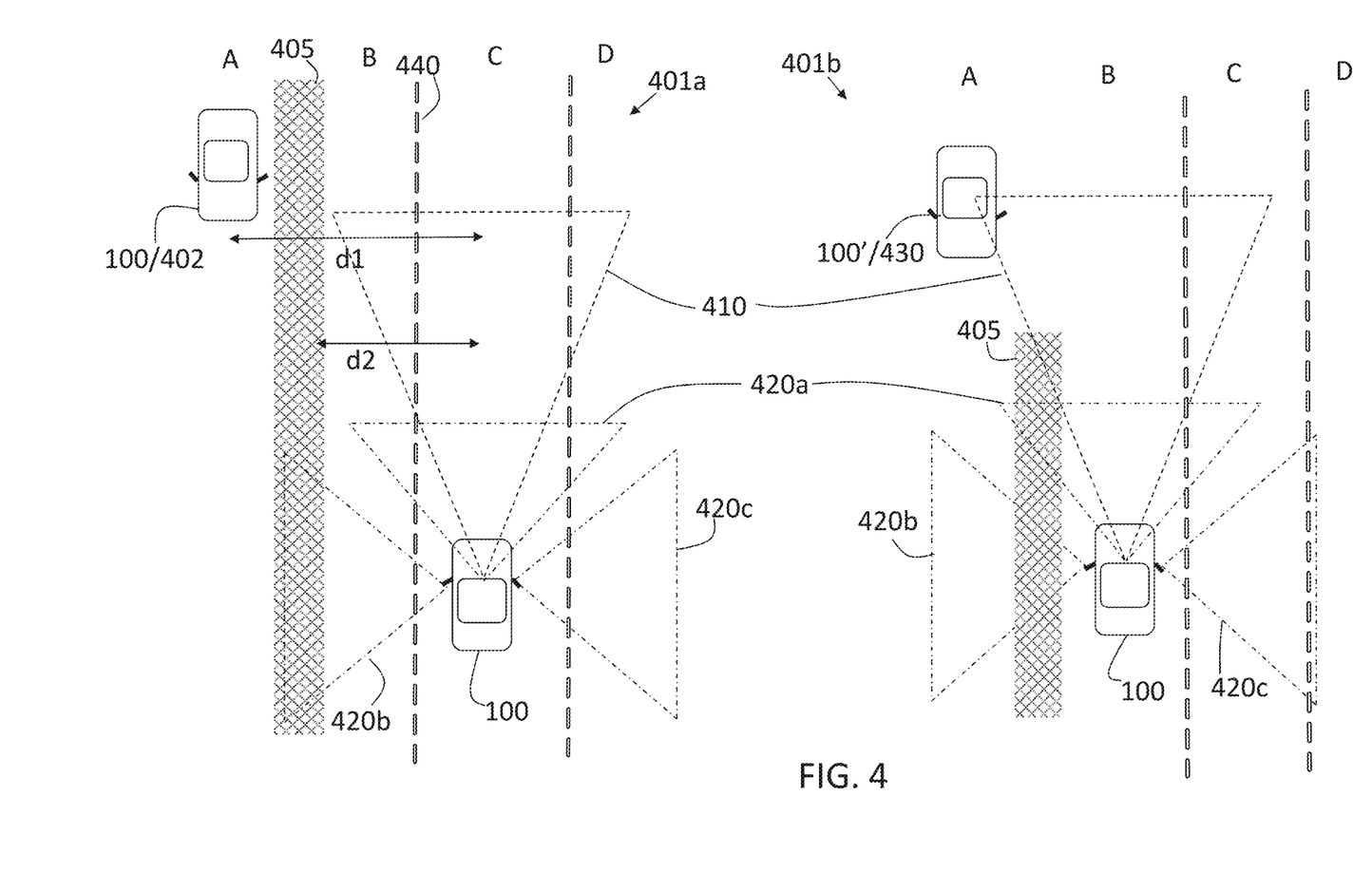
FIG. 4 illustrates two more scenarios in which a lane change is distinguished from a turn according to one or more embodiments.

FIG. 4 shows two scenarios 401*a*, 401*b* in which a lane change is distinguished from a turn according to one or more embodiments. The two scenarios 401*a*, 401*b* shown in FIG. 4 are at the same location at which four lanes A, B, C, D are indicated. Lanes B, C, and D are on the right side of a median 405, and lane A is on the left side of the median 405. Thus, the traffic in lane A travels in the opposite direction as compared with traffic in lanes B, C, and D. A vehicle 100 travelling on the right side of median 405 has a radar system and three cameras as part of the sensor systems 120, as shown in FIG. 1. Like FIGS. 2 and 3, FIG. 4 indicates the field of view 410 of the radar system and the respective fields of view 420*a*, 420*b*, 420*c* of the three camera systems. An oncoming vehicle 100 in lane A is within the field of view 410 of the radar system in scenario 401*b* but not within the field of view 210 in scenario 401*a*. Thus the vehicle in lane A is labeled as an undetected object 402 in scenario 401*a* and is labeled as a potential object 430 of concern that is detected by the radar system only in scenario 401*b*. The field of view 410 may be of a lidar or other sensor system 120 in alternate embodiments.

The camera with the field of view 420b records the median 405 and the single broken line 440 to the left of the vehicle 100 in scenario 401a. The presence of the single broken line 440, the distance d1 to the lane beyond the median 405, or the distance d2 to the median 405 would indicate to the controller 110 that the vehicle 100 is not in a position to make a left turn in scenario 401a. That is, the driver of the vehicle 100 should not initiate a left turn from a lane (lane C) that is separated from the other side of the median 405 by another lane of traffic (lane B) that is traveling in the same direction. As a result, any motion initiated by the driver that could be interpreted as either a lane change into lane B or a left turn would be distinguished by the controller 110 as being most likely a lane change.

Scenario 401b differs from scenario 401a in that the camera with the field of view 420b sees the median 405 next to the vehicle 100 with no lines (e.g., single broken line 440) separating the vehicle 100 from the median 405. This information indicates to the controller 110 that the vehicle 100 cannot properly make a lane change to a lane to the left of the vehicle 100. In fact, at the moment that is shown in FIG. 4, the controller 110 would determine that no left turn or lane change could be performed, because the median 405 is adjacent to the vehicle. However, once the median 405 has ended, ahead of the position of the vehicle 100 shown in FIG. 4, a left turn, rather than a lane change, is likely the intention of the driver based on any motions indicating movement to the left. This is because a median 405 is not likely to separate lanes of traffic moving in the same direction. Thus, in this scenario 401b, based on information from the camera with field of view 420b, the controller 110 would determine that any motion initiated by the driver that could be interpreted as either a lane change into lane A or a left turn would most likely be a left turn. In this case, the detection of the vehicle 100 as an oncoming object 430 is relevant to any warning or action taken by vehicle systems 150.

Figure 5:
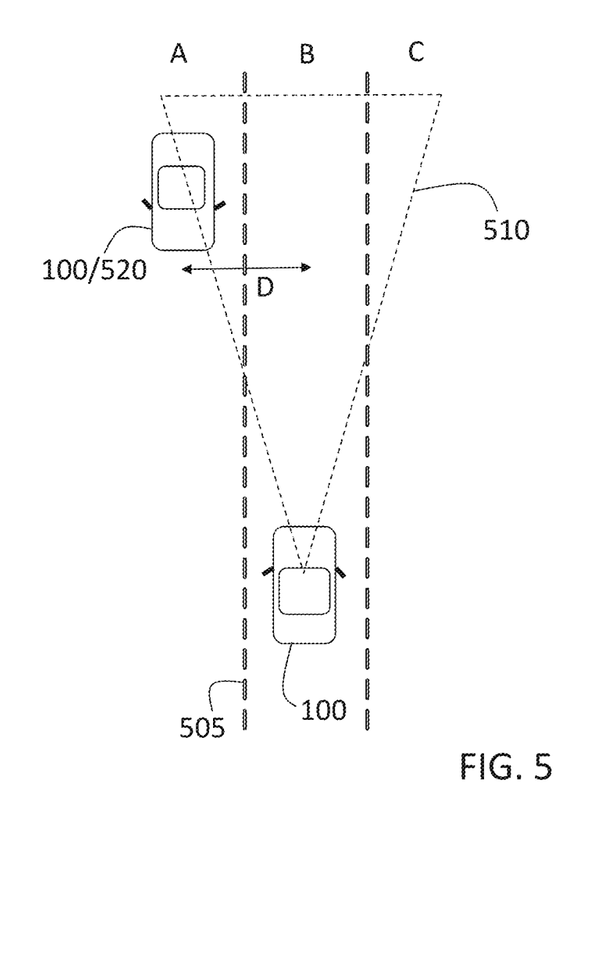
FIG. 5 shows an exemplary scenario in which a lane change is distinguished from a turn according to one or more embodiments.

FIG. 5 shows an exemplary scenario in which a lane change is distinguished from a turn according to one or more embodiments. Three lanes A, B, and C are shown separated by dashed lines 505. A vehicle 100 traveling in lane B includes a radar system as one of its sensors systems 120, as discussed with reference to FIG. 1. The field of view 510 of the radar system includes another vehicle 100 that is detected as an oncoming object 520. The controller 110 determines that the distance D between the oncoming object 520 and the current lane (lane B) is less than a lane width distance. Thus, the lane (lane A) immediately to the left of the lane (lane B) in which the vehicle 100 is travelling has oncoming traffic. As a result, a lane change to the left is not feasible, and the controller 110 will distinguish any movement to the left as a turn rather than a lane change. The current example differs from the examples discussed with reference to FIGS. 2-4 because the controller 110 may rely on a single sensor system 120 (e.g., radar system) to make the distinction.

Figure 6:
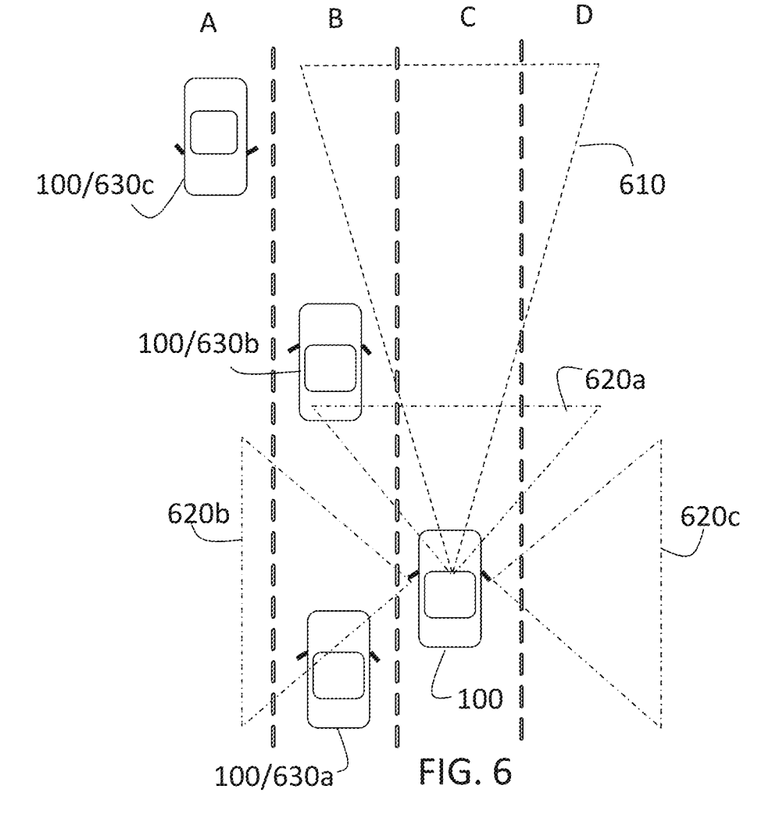
FIG. 6 shows another exemplary scenario in which a lane change is distinguished from a turn according to one or more embodiments.

FIG. 6 shows an exemplary scenario in which a lane change is distinguished from a turn according to one or more embodiments. Four lanes A, B, C, D are shown. A vehicle 100 travelling in lane C includes a radar system and three cameras as sensor systems 120, as discussed with reference to FIG. 1. The field of view 610 of the radar system, and the respective fields of view 620a, 620b, 620c of each of the cameras are shown in FIG. 6. Two other vehicles 100 are detected as objects 630a, 630b that are travelling in the same direction as the vehicle 100 in lane C. These objects 630a, 630b are detected by the cameras of the vehicle 100. Object 630a is determined to be moving in the same direction as the vehicle 100 based on a series of frames obtained by the camera with field of view 620b, and object 630b is determined to be moving in the same direction as the vehicle 100 based on a series of frames obtained by the camera with field of view 620a. This information is used by the controller 110 to determine that a lane of traffic moving in the same direction as the vehicle 100 is immediately to the left of the vehicle 100. Thus, any movement to the left by the vehicle 100 would be interpreted as a lane change (into lane B) rather than as a left turn.

This example is similar to that discussed with reference to FIG. 5 because a single type of sensor system 120 is used to distinguish the lane change from the turn. However, the type of sensor system 120 used in the current example is cameras, while the type of sensor system 120 used in the example discussed with reference to FIG. 5 is a radar system and could, instead, be a lidar. The oncoming vehicle 100, indicated as object 630c, is not detected by the sensor systems 120 of the vehicle 100 that are discussed in this example.

Figure 7:
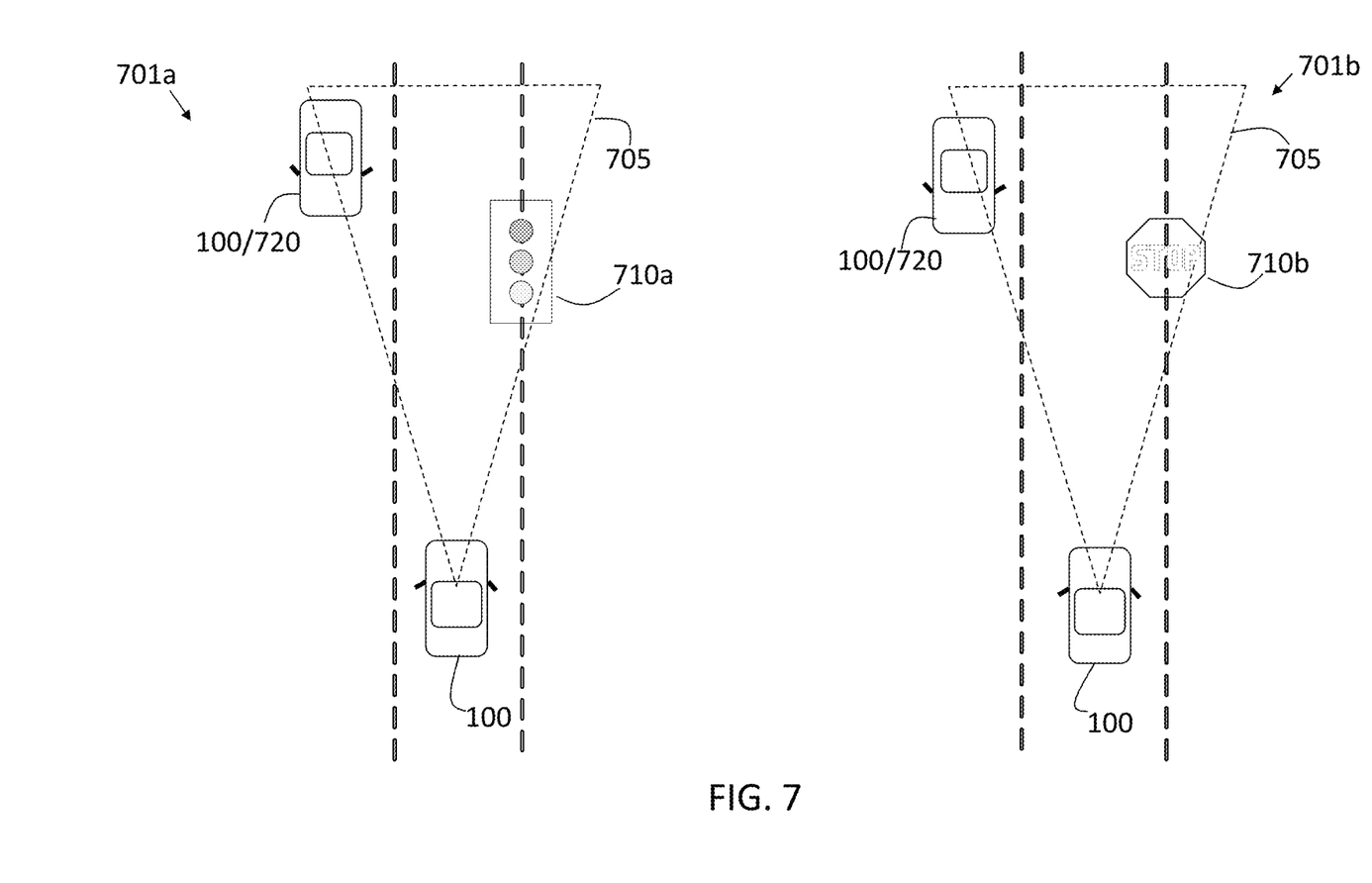
FIG. 7 illustrates two scenarios in which a lane change is distinguished from a turn according to one or more embodiments.

FIG. 7 shows exemplary scenarios 701a, 701b in which traffic signals 710a, 710b are used to distinguish a lane change from a turn according to one or more embodiments. In each scenario 701a, 701b, a vehicle 100 approaches a traffic signal 710a, 710b. The vehicle 100 includes a sensor system 120 (e.g., camera, lidar system, radar system) with a field of view 705 indicated in FIG. 7. Based on the sensor system 120, a traffic signal 710a, which is a traffic light, is identified at some distance in front of the vehicle 100. In scenario 701b, the sensor system 120 is used to identify a traffic signal 710b, which is a stop sign, at some distance in front of the vehicle. If the traffic signal 710a, 710b is determined to be within a threshold distance of the vehicle 100, the controller 110 determines that a driver-initiated movement toward the left is more likely to be a turn than a lane change. This is because a lane change through an intersection, which is indicated by the presence of the traffic signal 710a, 710b, is low.

The scenarios 701a, 701b shown in FIG. 7 also indicate that the controller 110 may use more than one input to make a determination of whether a turn or lane change is more likely to be the intent of a driver. An oncoming vehicle 100 is indicated as obstacle 720 in FIG. 7. The oncoming vehicle 100 is also in the field of view 705 of the sensor system 120. The detection of this oncoming vehicle 100 in a lane determined to be an adjacent lane to the vehicle 100 (according to the embodiment detailed with reference to FIG. 5) may augment the information used by the controller 110. The embodiments discussed with reference to FIGS. 2 and 3 may additionally be used by the controller 110, as well, based on additional sensor systems 120 (e.g., cameras) that identify the lane marker or a road marker.

Figure 8:
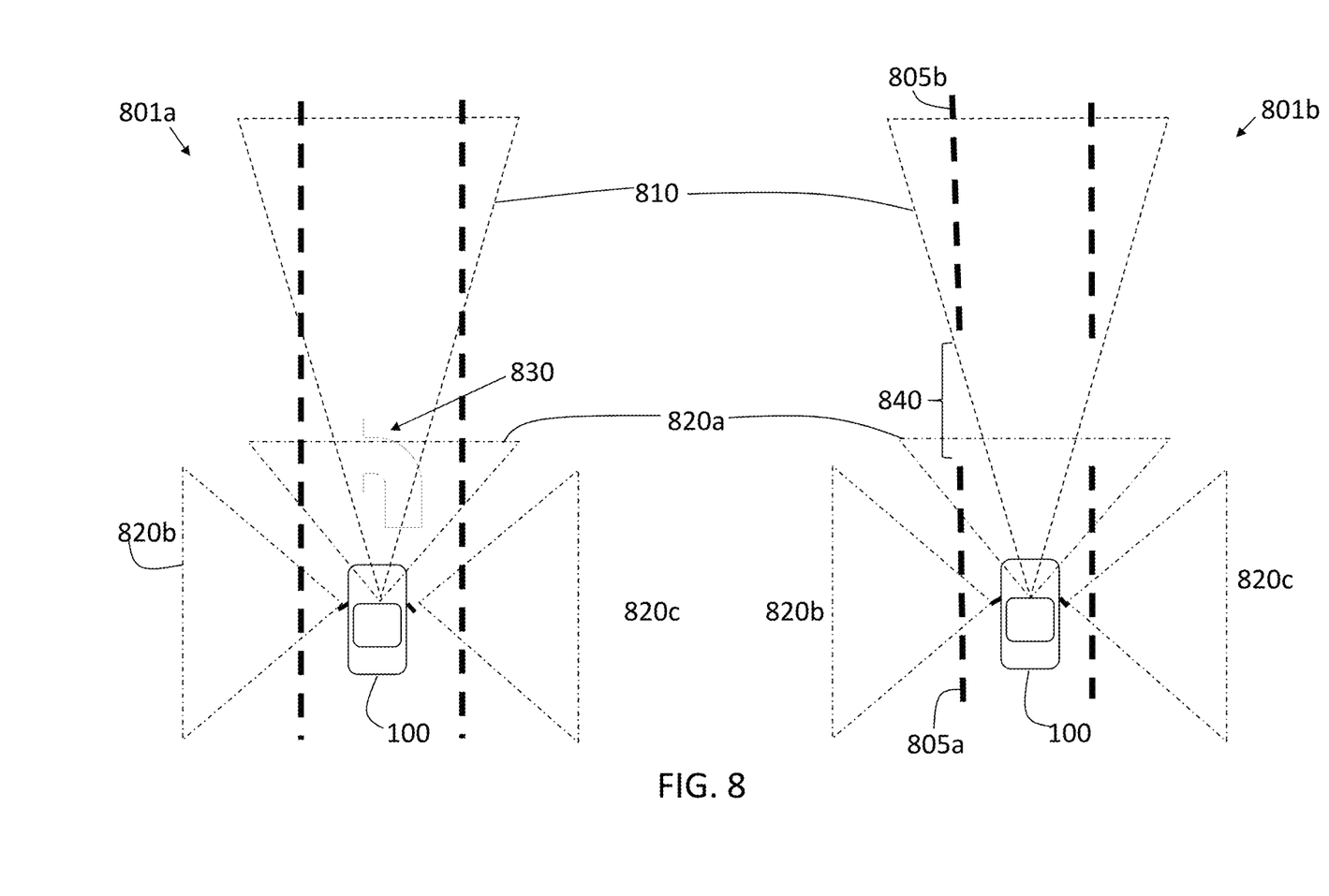
FIG. 8 illustrates two more scenarios in which a lane change is distinguished from a turn according to one or more embodiments.

FIG. 8 shows exemplary scenarios 801a, 801b in which a lane change is distinguished from a turn according to one or more embodiments. A vehicle 100 shown in FIG. 8 includes a radar system and three cameras as sensor systems 120, as discussed with reference to FIG. 1. The field of view 810 of the radar system, and the respective fields of view 820a, 820b, 820c of each of the cameras are shown in FIG. 8. The examples in FIG. 8 indicates that road markings may be used by the controller 110 to distinguish the likelihood of a lane change from a turn.

For example, in scenario 801a, a left-turn only marking 830 in the field of view 820a of one of the cameras of the vehicle 100 indicates that the vehicle 100 is in a lane from which it is supposed to turn left. Thus, the controller 110 would determine that any movement toward the left is more likely the initiation of a left turn rather than a lane change. As another example, in scenario 801b, the break 840 separating the lane markings 805a, 805b indicates that a turn may be taken at the break 840. Thus, the controller 110 would determine that any movement toward the left is more likely the initiation of a left turn rather than a lane change.

Figure 9:
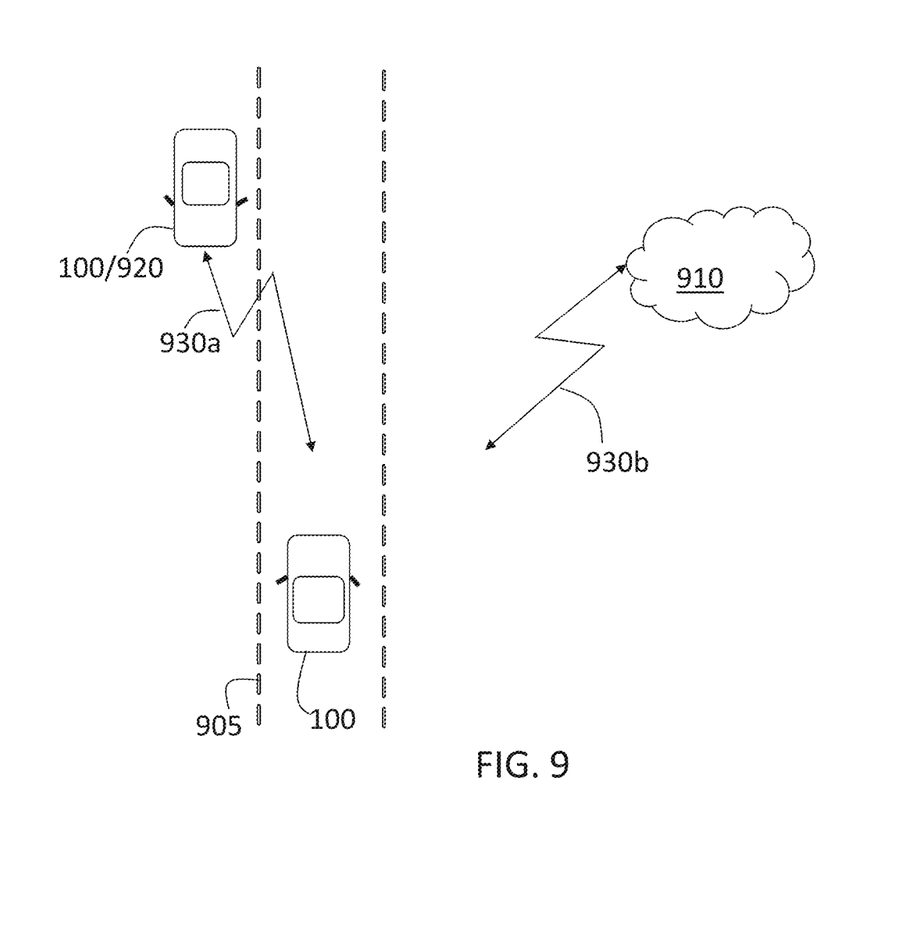
FIG. 9 shows another exemplary scenario in which messages are used to distinguish a lane change from a turn according to one or more embodiments.

FIG. 9 shows an exemplary scenario in which a lane change is distinguished from a turn according to one or more embodiments. A communication network 910 (e.g., cloud server, direct communication system) and another vehicle 100, which is an oncoming object 920 to the vehicle 100, communicate with the vehicle 100. The object 920 sends a vehicle-to-vehicle (V2V) message 930a. In addition or alternately, the communication network 910 may perform vehicle-to-infrastructure (V2I) or other vehicle-to-everything (V2X) communication using messages 930b. The infrastructure may be a subscription-based service provided by the manufacturer of the vehicle 100, for example. V2X communication may come from a pedestrian, communication system on a road sign or traffic light, or other source in the vicinity of the location of the vehicle 100.

The message 930a may indicate the location of the oncoming vehicle 100 (object 920), for example. This indication may inform the controller 110 that the adjacent lane is for oncoming traffic such that a lane change to the left is unlikely, similarly to detecting another vehicle 100 with the radar or camera systems as discussed with reference to FIGS. 5 and 6. The message 930b may explicitly indicate the type of lane (e.g., turn lane, center lane) that the vehicle 100 is in such that the controller 110 may determine whether a turn or lane change is likely. The messages 930a, 930b may augment the types of information discussed with reference to FIGS. 2-8 rather than being used alone.

Figure 10:
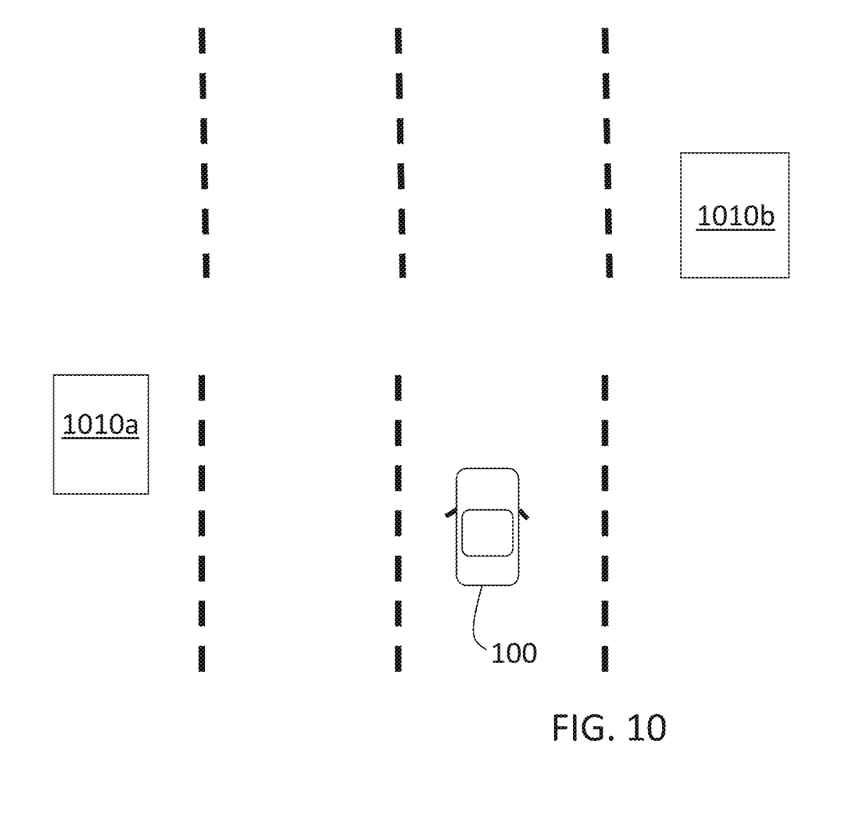
FIG. 10 shows another exemplary scenario in which navigation information is used to distinguish a lane change from a turn according to one or more embodiments.

FIG. 10 shows an exemplary scenario in which a lane change is distinguished from a turn according to one or more embodiments. The navigation system of the vehicle 100 (one of the sensor systems 120 discussed with reference to FIG. 1) may indicate the road configuration and the location of the vehicle 100 with sufficient accuracy to allow the controller 110 to directly determine lane information for the vehicle 100. For example, the buildings 1010a, 1010b and the relative distance of the vehicle 100 from the buildings may be indicated to the controller 110. This location information, like the lane information determined in the examples discussed with reference to FIGS. 2-4, may indicate to the controller 110 whether a turn or lane change is likely. Like the messages 930a, 930b, the navigation system information may augment, rather than replace, information from other sensor systems 120.

Figure 11:
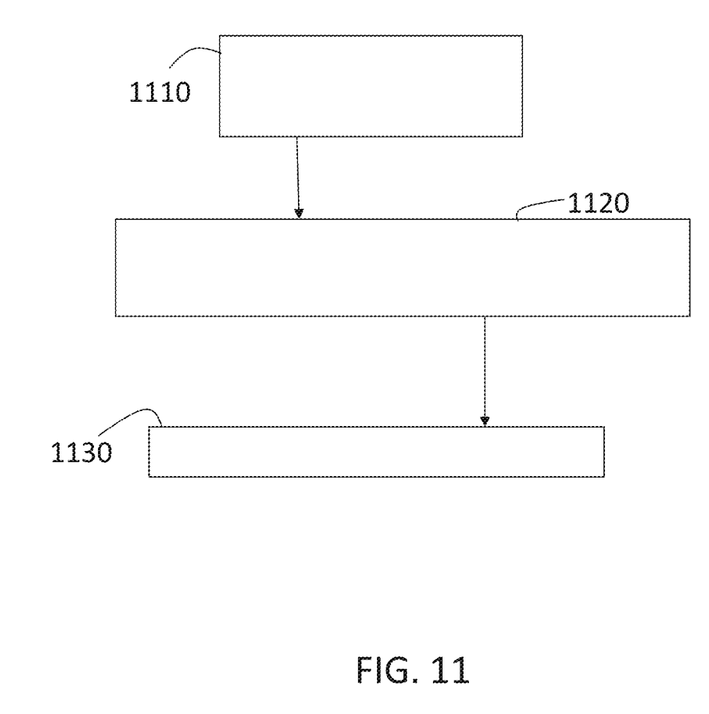
FIG. 11 is a process flow of a method of distinguishing between a turn according to one or more embodiments.

FIG. 11 is a process flow of a method of distinguishing between a lane change and a turn according to one or more embodiments. At block 1110, obtaining information includes the controller 110 obtaining information from one or more sensor systems 120 (e.g., radar system, lidar system, camera, navigation system) or other systems (e.g., communication interface 130, user interface system 140). Determining whether a lane change or a turn is more likely, at block 1120, is performed by the controller 110 based on the information (obtained at block 1110). Modifying vehicle system 150 action, at block 1130, refers to warnings or other actions related to a turn being delayed or omitted based on a determination (at block 1120) that a lane change is more likely than a turn.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of distinguishing between a lane change and a turn of a vehicle as an intended movement of the vehicle based on a driver-initiated motion by a driver of the vehicle toward an adjacent lane that is adjacent to a lane occupied by the vehicle, the method comprising:
    obtaining input from one or more sources, the one or more sources including a sensor system or a communication system;
    processing the input from the one or more sources to obtain indirect information that indicates a direction of travel in the adjacent lane or to obtain direct information specific to a location of the vehicle;
    determining whether the lane change or the turn is more likely to be the intended movement of the driver of the vehicle based on the indirect information or the direct information; and
    modifying an action of a vehicle system based on the determining whether the lane change or the turn is more likely, wherein obtaining the indirect information includes determining whether a distance between the vehicle and a double line or double-dashed line is more than a lane width such that another lane separates the vehicle from the double line or the double-dashed line.

2. The method according to claim 1, wherein the modifying the action of the vehicle system includes modifying a warning provided through an infotainment system.

3. A system to distinguish between a lane change and a turn of a vehicle as an intended movement of the vehicle based on a driver-initiated motion of a driver of the vehicle toward an adjacent lane that is adjacent to a lane occupied by the vehicle, the system comprising:
    one or more sources configured to provide input, wherein the one or more sources include a sensor system or a communication system;
    a controller configured to process the input from the one or more sources to obtain indirect information that indicates a direction of travel in the adjacent lane or to obtain direct information specific to a location of the vehicle and determine whether the lane change or the turn is more likely to be the intended movement of the driver of the vehicle based on the indirect information or the direct information, wherein the controller modifies an action of a vehicle system based on determining whether the lane change or the turn is more likely, wherein the controller is configured to obtain the indirect information based on determining whether a distance between the vehicle and a double line or double-dashed line is more than a lane width such that another lane separates the vehicle from the double line or the double-dashed line.

4. The system according to claim 3, wherein the controller is configured to modify the action of the vehicle system by modifying a warning provided through an infotainment system.

\* \* \* \* \*